United States Patent
Kim et al.

(10) Patent No.: US 11,426,795 B2
(45) Date of Patent: Aug. 30, 2022

(54) SILVER PARTICLES AND MANUFACTURING METHOD THEREFOR

(71) Applicant: DAE JOO ELECTRONIC MATERIALS CO., LTD., Siheung-Si (KR)

(72) Inventors: Sangwoo Kim, Siheung-Si (KR); Chiho Yoon, Siheung-Si (KR); Youngho Lee, Siheung-Si (KR); Jong Chan Lim, Siheung-Si (KR); Moohyun Lim, Siheung-Si (KR); Wonjun Jo, Siheung-Si (KR)

(73) Assignee: DAE JOO ELECTRONIC MATERIALS CO., LTD., Siheung-Si (KR)

( * ) Notice: Subject to any disclaimer, the term of this patent is extended or adjusted under 35 U.S.C. 154(b) by 222 days.

(21) Appl. No.: 16/619,371

(22) PCT Filed: Jun. 4, 2018

(86) PCT No.: PCT/KR2018/006368
§ 371 (c)(1),
(2) Date: Dec. 4, 2019

(87) PCT Pub. No.: WO2018/226001
PCT Pub. Date: Dec. 13, 2018

(65) Prior Publication Data
US 2020/0156158 A1    May 21, 2020

(30) Foreign Application Priority Data

Jun. 5, 2017 (KR) .................. 10-2017-0069483

(51) Int. Cl.
*B22F 9/24* (2006.01)
*B22F 1/00* (2022.01)
(Continued)

(52) U.S. Cl.
CPC .............. *B22F 9/24* (2013.01); *B22F 1/0007* (2013.01); *B22F 9/04* (2013.01); *C09D 5/24* (2013.01);
(Continued)

(58) Field of Classification Search
CPC .......................................... B22F 9/24
See application file for complete search history.

(56) References Cited

U.S. PATENT DOCUMENTS 3,892,562 A * 7/1975 Miller .................. C22B 11/025
75/634
5,439,502 A    8/1995 Kodas et al.
(Continued)

FOREIGN PATENT DOCUMENTS

KR    10-2002-0017490 A    3/2002
KR       10-0490668 B1    5/2005
(Continued)

OTHER PUBLICATIONS

International Search Report for International Application No. PCT/KR2018/006368, dated Sep. 5, 2018.
Chinese Office Action for 201880050943.1, dated Jan. 4, 2022.

*Primary Examiner* — William D Young
(74) *Attorney, Agent, or Firm* — Nixon Peabody LLP (57) ABSTRACT

The present invention relates to silver particles capable of having a uniform particle distribution, preventing agglomeration of a powder, and significantly improving dispersibility, the silver particles each having pores therein, and to a manufacturing method therefor and, more specifically, to a manufacturing method for silver particles, the method comprising a silver-complex forming step, a silver slurry preparing step, and a silver particle obtaining step, and to silver particles manufactured therefrom.

3 Claims, 4 Drawing Sheets

(51) Int. Cl.
  *B22F 9/04* (2006.01)
  *C09D 5/24* (2006.01)
  *H01B 1/22* (2006.01)
  *B23K 35/02* (2006.01)
  *C09D 11/52* (2014.01)
  *B22F 1/0655* (2022.01)

(52) U.S. Cl.
  CPC .............. *H01B 1/22* (2013.01); *B22F 1/0655* (2022.01); *B22F 2301/255* (2013.01); *B23K 35/025* (2013.01); *C09D 11/52* (2013.01)

(56) References Cited

U.S. PATENT DOCUMENTS

| | | | |
|---|---|---|---|
| 2006/0047043 A1* | 3/2006 | Nakayoshi | C08K 9/04 524/413 |
| 2008/0028889 A1 | 2/2008 | Irizarry-Rivera et al. | |
| 2015/0034883 A1* | 2/2015 | Hirata | H01L 31/022425 252/514 |
| 2017/0173698 A1* | 6/2017 | Gong | C22B 15/0095 |

FOREIGN PATENT DOCUMENTS

| | | |
|---|---|---|
| KR | 10-0954425 B1 | 4/2010 |
| KR | 10-1239816 B1 | 3/2013 |
| KR | 10-2014-0125418 A | 10/2014 |

* cited by examiner

SILVER PARTICLES AND MANUFACTURING METHOD THEREFOR

CROSS-REFERENCE TO RELATED APPLICATIONS

This application is the United States National Phase filed under 35 U. S. C. § 371 of International Application filed under the Patent Cooperation Treaty ("PCT") serial number PCT/KR2018/006368, filed on Jun. 4, 2018, which in turn claims priority under 35 USC § 119 to Korean Patent Application No. 10-2017-0069483, filed on Jun. 5, 2017, in the Korean Intellectual Property Office, the disclosure of which is incorporated herein by reference in its entirety.

TECHNICAL FIELD

The following disclosure relates to silver (Ag) particles having internal pores formed therein with excellent dispersibility, and a method of preparing the same.

BACKGROUND

Since silver (Ag) powder has physical properties such as high electrical conductivity, thermal conductivity and oxidation resistance, it has been widely used in various materials such as a paste for electronic materials, a conductive ink, a shielding agent and a spacer.

In general, a method of preparing silver powder includes a physical method and a chemical method, and the silver powder has different density, surface area, average particle size, shape, particle size distribution and the like depending on the preparation method. U.S. Pat. Registration No. 5,439,502 discloses a method of preparing silver powder by dissolving a thermally decomposable, silver-containing compound in a volatile solvent to produce aerosol as carrier gas, and heating the aerosol to or above a decomposition temperature of the silver-containing compound. This is a physical method, and the processes such as producing aerosol and heating are complicated and highly energy-consuming. Korean Patent Laid-Open Publication No. 2002-0017490 discloses preparing silver powder by a chemical method, including dissolving silver nitrate in distilled water and mixing the solution with ammonia water, and reducing the solution with hydroquinone, and the silver powder prepared by these methods including the physical method have a non-uniform actual particle size, and poor sphericity.

In particular, in the case of powder, as the particle size is smaller, the specific surface area is increased in proportion to the square of a powder diameter change, and thus, the surface area becomes very large. Due to this increase in surface activity, flowability of powder is decreased, for example, powder adsorbs other components, or powder sticks to each other, and dispersibility and storage stability are significantly deteriorated, thereby not achieving desired physical properties when applying the powder in various fields.

Thus, research and development of a method of preparing silver powder is currently needed, which may prepare spherical silver powder having a uniform particle size distribution while increasing process efficiency, allow the prepared powder not to be agglomerated together after preparation, significantly improve dispersibility of the powder, and implement the physical properties which are stably excellent for a long time.

SUMMARY

An embodiment of the present invention is directed to providing spherical silver powder having pores formed therein, which has a uniform particle size distribution, may prevent agglomeration of the powder, and significantly improve dispersibility. Furthermore, an embodiment of the present invention is directed to providing a conductive paste which may include the silver particles, thereby significantly improving conductivity, and maximizing efficiency when applied to an energy device such as a solar cell.

In addition, an embodiment of the present invention is directed to providing a method of preparing silver powder which may implement excellent physical properties stably for a long time while maximizing process efficiency.

In one general aspect, a method of preparing silver particles having internal pores formed therein includes:

a step of forming a silver complex by adding an alkaline solution or a complexing agent to an aqueous solution containing a silver (Ag) precursor and stirring the solution;

a step of preparing silver slurry by adding a reducing agent to the solution containing the silver complex, and heating and mixing the solution in a temperature range of 50 to 90° C. to precipitate silver particles; and a step of obtaining the silver particles by filtering and drying the silver slurry.

In the method of preparing silver particles having internal pores formed therein according to an exemplary embodiment of the present invention, the step of forming the silver slurry may be to add the reducing agent to the solution containing the silver complex at least at 0.2 equivalents/sec relative to silver.

In the method of preparing silver particles having internal pores formed therein according to an exemplary embodiment of the present invention, the reducing agent may be any one or more aldehyde-containing organic materials selected from the group consisting of formaldehyde, acetaldehyde, glyoxal, benzaldehyde and glucose.

The method of preparing silver particles having internal pores formed therein according to an exemplary embodiment of the present invention may further include a step of pulverizing the obtained powder.

In another general aspect, a silver particle having internal pores is prepared by the above preparation method, and has a true density of 9 to 10 g/cc.

In another general aspect, a conductive paste includes the silver particles having internal pores formed therein.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the silver particle having internal pores formed therein of the present invention and a method of preparing the same will be described in detail. The present invention will be understood better by the following exemplary embodiments, which are intended to be illustrative of the present invention, and not to limit the protection scope, defined by the attached claims. The technical and scientific terms used herein have unless otherwise defined, the meaning commonly understood by those of ordinary skill in the art.

In the provision of silver particles which may be applied to various material fields including a conductive paste, the inventors of the present invention conducted a study on a method of preparing silver particles which may prevent bonding or agglomeration of the particles together, and moreover, secure excellent dispersibility, and as result, found that by including a combination of processes which are adding an alkaline solution or a complexing agent to an aqueous solution containing a silver precursor in a reactor and stirring the solution to obtain a silver complex, and then adding a reducing agent to the solution containing the silver complex and heating and mixing the solution under a certain condition to precipitate silver particles, the particles are slowly grown to minimize bonding or agglomeration of the particles together, and at the same time, silver particles having internal pores formed therein with excellent dispersibility may be provided, thereby completing the present invention. In addition, the thus-prepared silver particle having internal pores formed therein may be applied to various material fields for such as curing type, low-temperature firing type and a solar cell electrode, and as an example, when applied to a paste for a solar cell front electrode as a conductive paste, may implement excellent resistance property and conversion efficiency at relatively low temperature.

An embodiment of the present invention relates to a method of preparing silver particles having internal pores formed therein including:

(a) a step of forming a silver complex by adding an alkaline solution or a complexing agent to an aqueous solution containing a silver (Ag) precursor and stirring the solution;

(b) a step of preparing silver slurry by adding a reducing agent to the solution containing the silver complex, and heating and mixing the solution in a temperature range of 50 to 90° C. to precipitate silver particles; and (c) a step of obtaining the silver particles by filtering and drying the silver slurry.

Step (a) is to form a silver complex from a silver precursor compound, and as the silver precursor, any compound may be used without significant limitation as long as it may precipitate silver particles, and as an example, any one or more selected from the group consisting of silver nitrate, silver chloride, silver bromide and silver fluoride may be used. Preferably, using silver nitrate is more effective in terms of yield and reaction efficiency.

The silver complex is formed by a mixed reaction of the silver precursor compound with an alkaline solution or a complexing agent. The alkaline solution may adjust the pH of a reaction solution so that the particles are formed, and the complexing agent may adjust a shape of a complex to be formed.

The step of forming the silver complex may be carried out by using the alkaline solution and the complexing agent together with the silver precursor compound at the same time. In addition, the alkaline solution may not be used. By using a combination of the silver precursor compound and the complexing agent, the silver particles may be prepared to have a shape close to a true sphere without including a separate alkali solution component adjusting the pH. Furthermore, pores may be formed inside the particle.

As the alkaline solution, any alkaline solution is used without significant limitation as long as it may adjust the pH, and as a preferred example thereof, any one or more selected from the group consisting of sodium hydroxide, potassium hydroxide and lithium hydroxide may be used. Preferably, sodium hydroxide may be used.

As the complexing agent, any one or more selected from the group consisting of an ammonium ion feeder, for example, an aqueous ammonia ($NH_4OH$) solution, an aqueous ammonium sulfate (($NH_4)_2SO_4$) salt solution, an aqueous ammonium nitrate ($NH_4NO_3$) salt solution and an aqueous ammonium hydrogen phosphate (($NH_4)_2HPO_4$) salt solution, which may form a complex with a metal salt may be used, but not limited thereto. Preferably, using an aqueous ammonia solution is effective for preparing particles having a true sphere shape and forming pores inside the particles.

In the present invention, the aqueous ammonia solution easily forms a complex by the reaction with a silver precursor, and also minimizes production of silver ions, thereby being effective in terms of preparation of monodispersed particles. Furthermore, even in the case that the alkaline solution is not included, the aqueous ammonia solution may maintain the basic pH of the reaction system, thereby facilitating the silver precipitation process. In addition, the aqueous ammonia solution adjusts a subsequent process and the addition condition of the reducing agent which are carried out in a certain temperature range, that is, a feed flow rate when adding the reducing agent to the solution containing the silver complex, thereby being more effective for forming pores inside the silver particles.

The step of forming the silver complex may adjust an amount of the complexing agent relative to silver, thereby increasing silver complex formation efficiency. As a specific example, it is more effective that preferably 2 mol or more of ammonia water is used relative to silver. Specifically, when the silver-ammonia complex (complex salt) is formed, the color becomes darker and silver oxide is produced, and the amount of ammonia water may be adjusted considering the time point at which the solution becomes clear and is stabilized.

Step (b) is a step of preparing silver slurry by precipitating the silver particles by a reduction reaction in which the silver complex formed in the previous step is reacted with a reducing agent.

The present invention includes controlling a temperature range during a reduction reaction in the step of preparing silver slurry so that the pores are formed and grows inside the particles, and at the same time, monodispersed, spherical particles are simply and easily prepared.

The temperature range during the reduction reaction may be 50 to 90° C., preferably 60 to 85° C. When the temperature during the reduction reaction is less than ° C., the yield of particles is lowered, and when the temperature is more than 90° C., the inside of the particles becomes dense or dispersibility of the particles is lowered, and agglomeration of the particles together occurs. Thus, when the thus-obtained silver particles are applied to a conductive paste, an effect of physical property improvement in the electrical properties such as resistance characteristics or conversion efficiency is hardly expected.

Furthermore, the reduction reaction is carried out by a combination of adjusting a temperature range and at the same time adjusting addition condition when adding the reducing agent to the solution containing the silver complex, since the silver particles having internal pores formed therein may be prepared more easily, and the monodispersed spherical shape of the particles may allow the higher yield of the particles, thereby maximizing productivity. Here, the addition condition is characterized by adding the reducing agent to the solution containing the silver complex within a short time. That is, it is more effective that the process of adding the reducing agent is completed within a short time. As a preferred exemplary embodiment, it is more effective for controlling the shape of the powder to add the reducing agent to the solution containing the silver complex within seconds, preferably within 30 seconds, and more preferably within 20 seconds. Specifically, it is effective to add the reducing agent at least at 0.2 equivalents/sec, preferably 0.3 equivalents/sec or more relative to silver. More specifically, when the reducing agent is added at 0.3 to 1.3 equivalents/sec or more, more preferably 0.4 to 1.2 equivalents/sec or more relative to silver, effects of forming internal pores of the silver particles, having a particle distribution of monodispersity, and increasing productivity in a high yield may be exhibited. When the addition time of the reducing agent is extended, or the equivalent range of the reducing agent to be added relative to silver is out of the range, the shape or physical properties of the particle may be hardly controlled, internal pore formation may not be sufficient, the yield may be lowered, and the dispersibility may be decreased. That is, in the step of preparing silver slurry of step (b) in the present invention, it is more effective to add the reducing agent within a short time to complete the reaction.

Any type of reducing agent may be used without limitation, as long as the reducing agent may perform a reduction reaction to precipitate the silver particles from the silver complex. Specifically, it is effective to use an organic material containing aldehyde rather than to use a reducing agent having a rapid reduction reaction rate such as hydrazine ($N_2H_2$), in terms of forming internal pores, and forming monodispersed particles. The hydrazine has high reducing strength to reduce the reaction time, but formation of internal pores is difficult. It is preferred to use any one or more aldehyde-containing organic material selected from the group consisting of formaldehyde, acetaldehyde, glyoxal, benzaldehyde and glucose, for producing the silver particles which meet the purpose of the present invention, and reducing environmental loads due to by-products. It is more preferred to use any one or more selected from the group consisting of formaldehyde and acetaldehyde, in terms of dispersibility and low-temperature firing. Furthermore, it is more preferred to use formaldehyde, for further accelerating internal pore formation in the silver particles within a temperature range during the reduction reaction.

The reducing agent may be added to the solution containing the silver complex in the form of an aqueous solution.

The process of adding the reducing agent to the solution containing the silver complex may further include a dispersing agent. As the dispersing agent, a cationic surfactant, an anionic surfactant, a nonionic surfactant and the like may be used, and specifically, a triazole-based surfactant or polyethylene imine (PEI) may be used. The dispersing agent is used in terms of particle size distribution stability, and the use thereof is limited, in the method of preparing silver particles according to the present invention performing synthesis within a short time, since the dispersing agent may lower the yield, or cause agglomeration. As an example, the dispersing agent such as gelatin, hydroxyethyl cellulose, dexad, peptide and dextrin has no effect from using the dispersing agent, or rather causes agglomeration.

Specifically, in the process of precipitating the silver particles by the reduction reaction from the solution containing the silver complex, seeds for forming spherical silver particles are produced, and the produced seeds are grown to the particles by the reduction reaction of the seeds with the reducing agent. Here, the reduction reaction is performed within a certain temperature range, and furthermore, an addition rate of the reducing agent is adjusted, thereby obtaining monodispersed, spherical silver particles, improving dispersibility, preventing bonding or agglomeration of the obtained particles together, and also forming pores inside the particle. In addition, the yield of the silver particles having inner pores formed therein may be raised, and the productivity may be maximized.

Here, the reduction reaction is performed by stirring at the time of heating and mixing, and a stirring speed may be easily adjusted within a range of achieving the object of the present invention, however, it is preferred to perform stirring relatively strongly at 1,000 rpm to 5,000 rpm, and it is more preferred to perform stirring at a stirring speed of 1,500 rpm to 2,500 rpm.

The slurry prepared in the step of preparing the silver slurry contains the silver particles, and in order to remove a filtrate containing the reducing agent which may remain in the silver particles, a step of obtaining the silver particles by filtration and drying is carried out.

The step of obtaining the silver particles is to obtain silver precipitates from silver slurry, and preferably to obtain the silver particles by washing silver slurry several times using distilled water, and performing filtration. The washing is performed by using cold water, or a washing solution at 30 to 50° C. for more effective removal of organic materials.

The silver particles obtained from the step of obtaining the silver particles are subjected to drying. Here, the drying is not significantly limited within the range of achieving the object of the present invention, however, is performed preferably in a temperature range of 100 to 130° C., and a vacuum oven may be used. The dried silver particles are pulverized using an intensive mixer, a Henschel mixer or the like to obtain a final silver particle product.

Furthermore, the dried silver particles may be mixed with a lubricant and then polished, in addition to pulverizing the dried silver particles by mechanical collision. This process is more preferred, since the final silver particle product may secure long-term physical property stability, and also dispersibility and compatibility may be improved when using the particle product in combination with other components.

The silver particles having internal pores, obtained by the above-described method may have a true density of 9 g/cc to 10 g/cc, preferably 9.1 g/cc to 9.9 g/cc, and more preferably 9.3 g/cc to 9.7 g/cc. Here, the true density is measured using Accupyc II 1340.

In addition, the silver particles having internal pores as obtained above may have an average particle diameter (D50) of 0.1 to 5 μm.

The silver particles having internal pores according to the present invention may be applied to various electronic materials. As an embodiment, a conductive paste including the silver particles is provided. In addition, the conductive paste including the silver particles has a characteristic of particles, that is, internal pores, and may be applied as a cured type or a low temperature firing type due to the characteristics such as dispersibility and physical property stability, or preferably may be used as a paste for a solar cell electrode capable of implementing excellent resistance properties and conversion efficiency at relatively low temperature.

Hereinafter, the spherical silver particles having internal pores according to the present invention, and a method of preparing the same will be described by way of example, however, the present invention is not limited to the following Examples.

Example 1

60 kg of water and 17 kg of silver nitrate ($AgNO_3$) were added to a reactor, and 19.6 kg of a 28% aqueous ammonia solution was added thereto, thereby producing a silver-ammonia complex. The temperature of the solution in the reactor was maintained at 85° C., and 21.6 kg of an aqueous formalin solution (containing 37 wt % of formaldehyde (HCHO)) was added for 10 seconds to obtain silver slurry containing precipitated silver particles. The thus-obtained silver slurry was washed using water and filtered, dried for 4 hours in a vacuum oven at 120° C., and then pulverized using an intensive mixer to obtain silver powder.

Example 2

65 kg of water and 17 kg of silver nitrate ($AgNO_3$) were added to a reactor, and 19.6 kg of a 28% aqueous ammonia solution was added thereto, thereby producing a silver-ammonia complex. The temperature of the solution in the reactor was maintained at 65° C., and 19.4 kg of an aqueous formalin solution (containing 37 wt % of formaldehyde (HCHO)) was added for 20 seconds to obtain silver slurry containing precipitated silver particles. The thus-obtained silver slurry was washed using water and filtered, dried for 6 hours in a vacuum oven at 100° C., and then pulverized using an intensive mixer to obtain silver powder.

Example 3

75 kg of water and 17 kg of silver nitrate ($AgNO_3$) were added to a reactor, and 15.7 kg of a 28% aqueous ammonia solution was added thereto, thereby producing a silver-ammonia complex. The temperature of the solution in the reactor was maintained at 70° C., and 16.8 kg of an aqueous formalin solution (containing 37 wt % of formaldehyde (HCHO)) was added for 5 seconds to obtain silver slurry containing precipitated silver particles. The thus-obtained silver slurry was washed using water and filtered, dried for 6 hours in a vacuum oven at 100° C., and then pulverized using an intensive mixer to obtain silver powder.

Example 4

65 kg of water and 17 kg of silver nitrate ($AgNO_3$) were added to a reactor, and 19.6 kg of a 28% aqueous ammonia solution was added thereto, thereby producing a silver-ammonia complex. The temperature of the solution in the reactor was maintained at 50° C., and 21.6 kg of an aqueous formalin solution (containing 37 wt % of formaldehyde (HCHO)) was added for 5 seconds to obtain silver slurry containing precipitated silver particles. The thus-obtained silver slurry was washed using water and filtered, dried for 6 hours in a vacuum oven at 100° C., and then pulverized using an intensive mixer to obtain silver powder.

Example 5

65 kg of water and 17 kg of silver nitrate ($AgNO_3$) were added to a reactor, and 19.6 kg of a 28% aqueous ammonia solution was added thereto, thereby producing a silver-ammonia complex. The temperature of the solution in the reactor was maintained at 60° C., 0.663 kg of 10% polyoxyethylene laurylether (Hannong Chemicals Inc, Koremul-LE9) was added and stirred, and then 21.6 kg of an aqueous formalin solution (containing 37 wt % of formaldehyde (HCHO)) was added for 15 seconds to obtain silver slurry containing precipitated silver particles. The thus-obtained silver slurry was washed using water and filtered, dried for 6 hours in a vacuum oven at 100° c., and then pulverized using an intensive mixer to obtain silver powder.

Comparative Example 1

The process was performed in the same manner as in Example 1, except that the temperature of the solution in the reactor was changed to 45° C. during the preparation of the silver-ammonia complex.

Comparative Example 2

The process was performed in the same manner as in Example 1, except that the temperature of the solution in the reactor was changed to 94° C. during the preparation of the silver-ammonia complex.

Comparative Example 3

80 kg of water and 17 kg of silver nitrate ($AgNO_3$) were added to a reactor, and 19.6 kg of a 28% aqueous ammonia solution was added thereto, thereby producing a silver-ammonia complex. The temperature of the solution in the reactor was maintained at 20° C., and 43.2 kg of an aqueous formaldehyde solution containing 18.7 wt % formaldehyde (HCHO) was added for 25 seconds to obtain silver slurry containing precipitated silver particles. The thus-obtained silver slurry was washed using water and filtered, dried for 6 hours in a vacuum oven at 100° c., and then pulverized using an intensive mixer to obtain silver powder.

Comparative Example 4

The process was performed in the same manner as in Example 1, except that the aqueous formalin solution was added for 120 seconds.

Comparative Example 5

60 kg of water and 17 kg of silver nitrate ($AgNO_3$) were added to a reactor, and 19.6 kg of a 28% aqueous ammonia solution was added thereto, thereby producing a silver-ammonia complex. The temperature of the solution in the reactor was maintained at 85° C., and 21.6 kg of an aqueous formalin solution (containing 37 wt % of formaldehyde (HCHO)) was added for 30 seconds, and at the same time 0.76 kg of 10% HEC (hydroxyethyl-cellulose, Sigma-Aldrich, CAS No. 9004-62-0) was added with stirring to obtain silver slurry containing precipitated silver particles. The thus-obtained silver slurry was washed filtered using water and filtered, dried for 4 hours in a vacuum oven at 120° c., and then pulverized using an intensive mixer to obtain silver powder.

silver particles of Comparative Example 3 had pores formed therein, however, agglomeration occurred locally between the particles, and the particle size distribution was represented to be broad. The silver particles of Comparative Example 4 had a longer addition time of the reducing agent, so that the shape control of the particles became difficult, and the physical properties thereof were deteriorated. In addition, the silver particles of Comparative Example 5 had fine powder as well as agglomeration, thereby having a very poor

TABLE 1

| Classification | Silver-ammonia complex | | | Aqueous reducing agent solution | | Reaction temperature (° C.) | Drying temperature (° C.) | Drying time (hr) |
|---|---|---|---|---|---|---|---|---|
| | Water | AgNO$_3$ (30 wt %) | Ammonia water (28 wt %) | Aqueous formalin solution (wt %/kg) | Addition time (s) | Reaction temperature (° C.) | Drying temperature (° C.) | Drying time (hr) |
| Example 1 | 60 | 17 | 19.6 | 37 | 21.6 | 10 | 85 | 120 | 4 |
| Example 2 | 65 | 17 | 19.6 | 37 | 19.4 | 20 | 65 | 100 | 6 |
| Example 3 | 75 | 17 | 15.7 | 37 | 16.8 | 5 | 70 | 100 | 6 |
| Example 4 | 65 | 17 | 19.6 | 37 | 21.6 | 5 | 65 | 100 | 6 |
| Example 5 | 65 | 17 | 19.6 | 37 | 21.6 | 15 | 60 | 120 | 4 |
| Comparative Example 1 | 60 | 17 | 19.6 | 37 | 21.6 | 10 | 45 | 120 | 4 |
| Comparative Example 2 | 65 | 17 | 19.6 | 37 | 21.6 | 10 | 94 | 120 | 4 |
| Comparative Example 3 | 80 | 17 | 19.6 | 18.7 | 43.2 | 25 | 20 | 100 | 6 |
| Comparative Example 4 | 60 | 17 | 19.6 | 37 | 21.6 | 120 | 85 | 120 | 4 |
| Comparative Example 5 | 60 | 17 | 19.6 | 37 | 21.6 | 30 | 85 | 120 | 4 |

The shape, size and particle size distribution of the final silver particles obtained in the above Examples and Comparative Examples were measured by a scanning electron microscope and an X-ray diffractometer. In addition, the silver paste prepared using the powder was screen printed on a light receiving surface which absorbs sunlight, and applied in a constant pattern to manufacture a test specimen. For the electrical properties of the substrate of the manufactured specimen, conversion efficiency (Eff, %) and a curve factor (FF, %) measured using CT-801 from Pasna are shown in Table 2.

Figure 1:
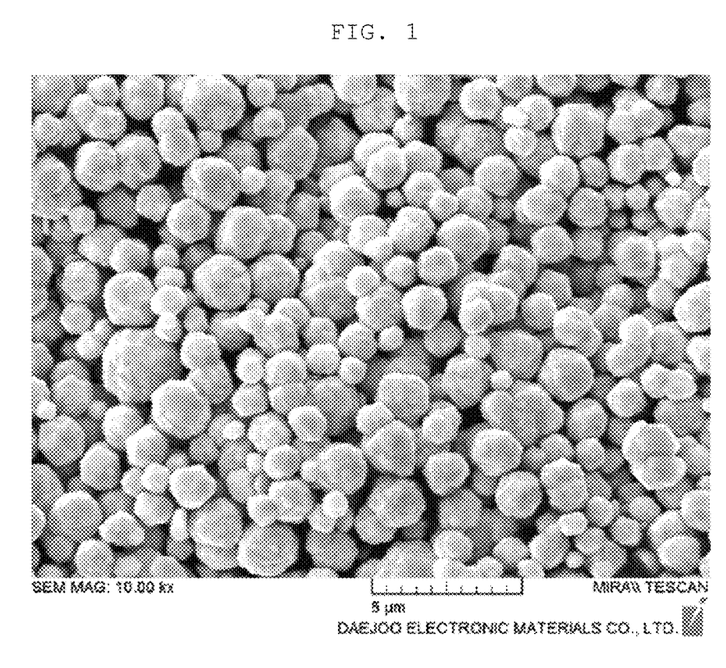
FIGS. 1 to 5 represent silver particles having internal pores formed therein according to Examples 1 to 5 of the present invention, respectively.
Figure 2:
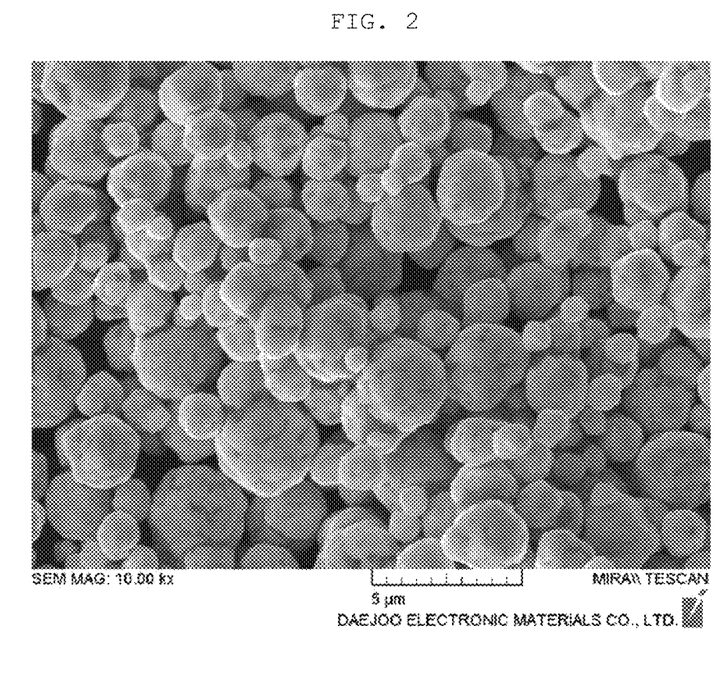
Figure 3:
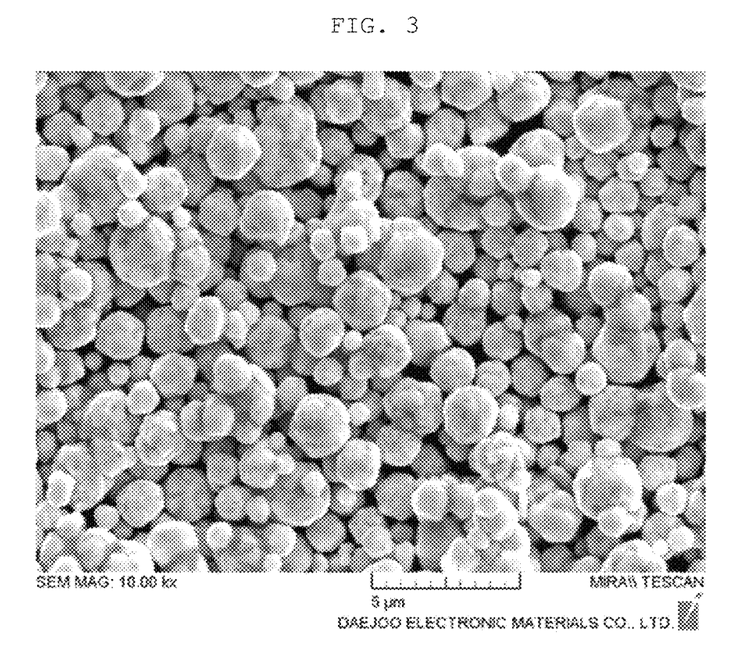
Figure 4:
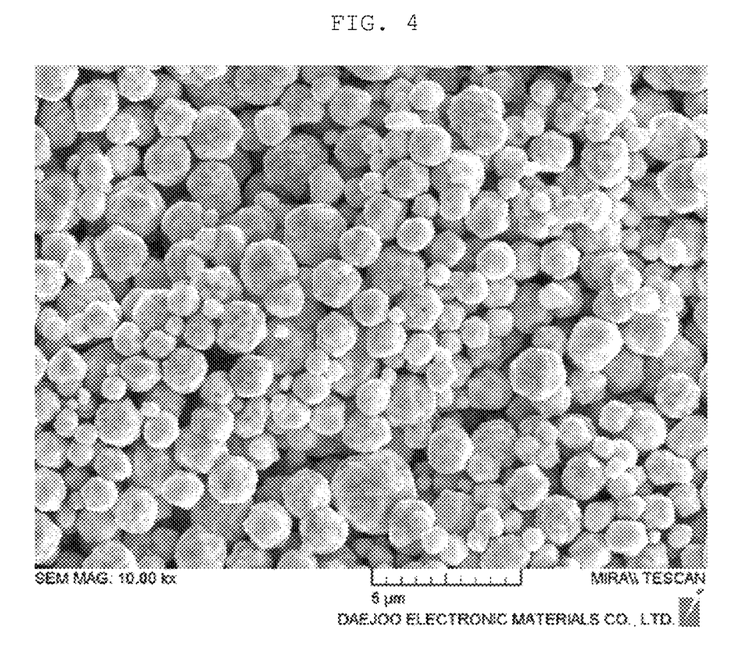
Figure 5:
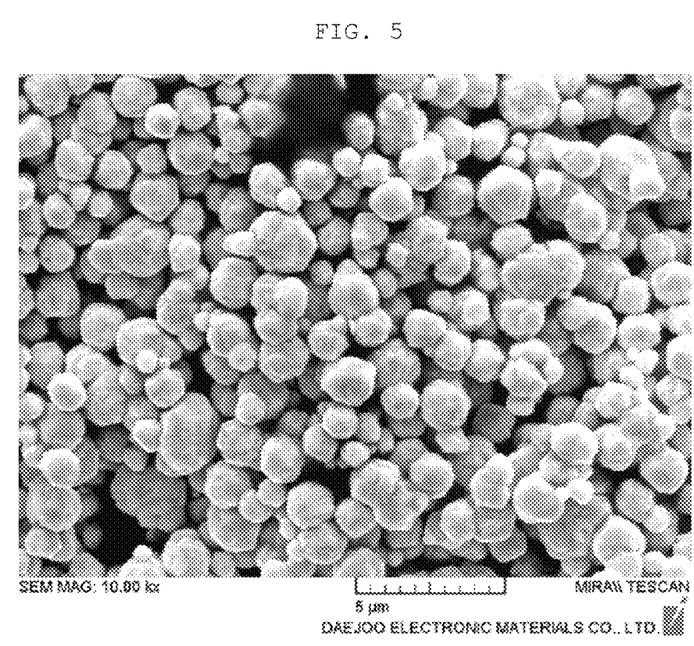

As shown in FIG. 1, it was confirmed that the silver particles according to Example 1 having a shape close to a true sphere, had excellent dispersibility, and did not cause agglomeration of the particles together. In addition, it was confirmed that the silver particles according to the Examples of the present invention had a true specific gravity of 9.3 to 9.8, and pores were formed inside the particles. Among them, the silver particles according to Example 2 had a relatively large particle size, and a small amount of produced pores, thereby representing the lowest true specific gravity. In addition, from the silver particles according to the Examples of the present invention, powder having excellent dispersibility was synthesized.

Figure 6:
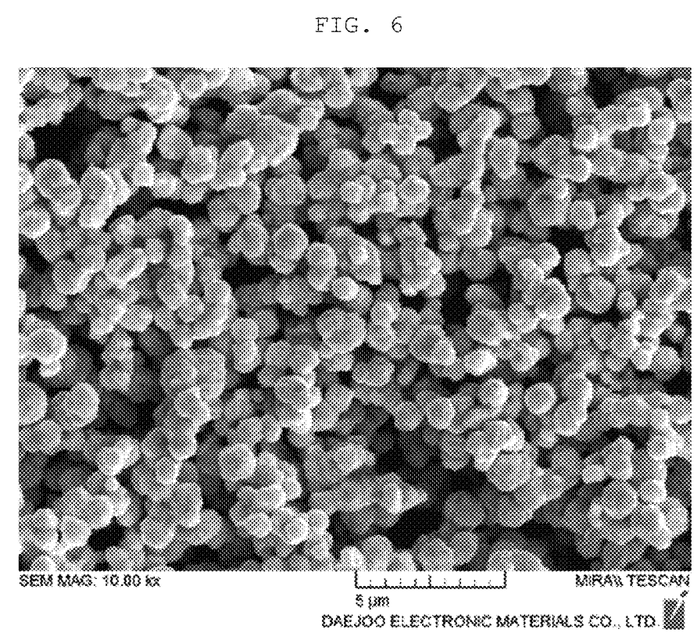
FIG. 6 represents silver particles having internal pores formed therein according to Comparative Example 2.
Figure 7:
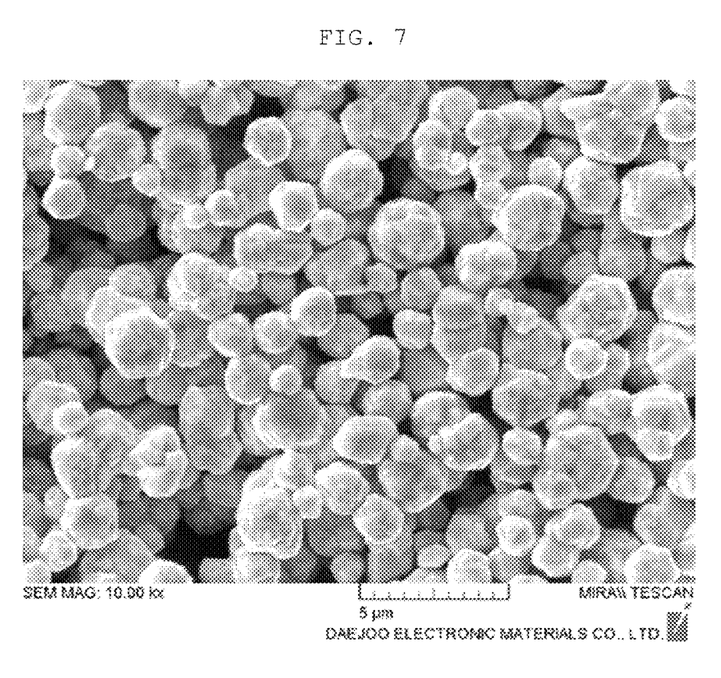
FIG. 7 represents silver particles having internal pores formed therein according to Comparative Example 3.
Figure 8:
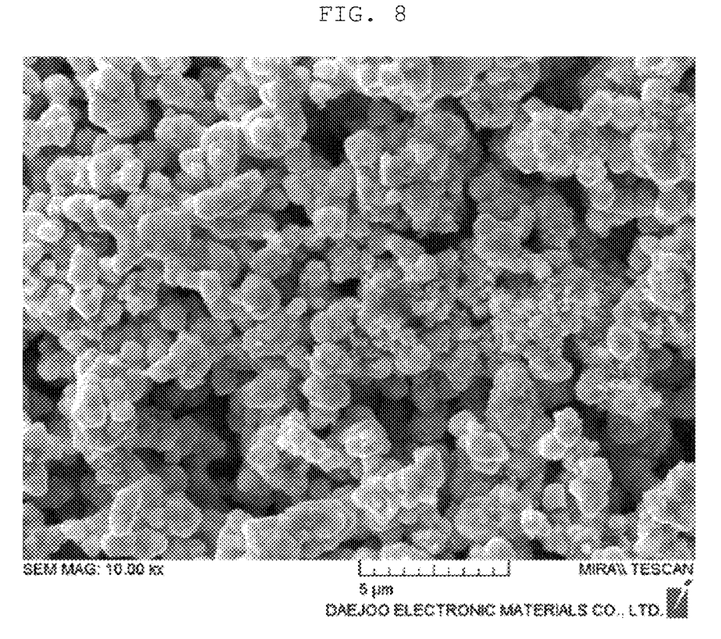
FIG. 8 represents silver particles having internal pores formed therein according to Comparative Example 5.

However, the silver particles according to Comparative Example 1 had a low yield, and represented a low surface area and a high true specific gravity, and thus, it was found that the internal pores were not formed well. In addition, the silver particles of Comparative Example 2 were synthesized near the boiling point of water, and the formability such as the volume of particles was represented to be poor. The particle size distribution, and thus, preparation of a paste was impossible, and the electrical properties were not able to be evaluated.

TABLE 2

| | D10 | D50 | D90 | BET (m$^2$/g) | True specific gravity (g/cm$^3$) | Eff. (%) | FF (%) |
|---|---|---|---|---|---|---|---|
| Example 1 | 0.81 | 1.79 | 3.81 | 0.53 | 9.6 | 18.72 | 79.55 |
| Example 2 | 1.02 | 2.33 | 4.11 | 0.47 | 9.8 | 18.43 | 79.46 |
| Example 3 | 0.74 | 1.65 | 3.35 | 0.58 | 9.3 | 18.86 | 79.60 |
| Example 4 | 0.61 | 1.57 | 3.14 | 0.63 | 9.5 | 18.61 | 79.44 |
| Example 5 | 0.65 | 1.51 | 3.19 | 0.68 | 9.4 | 18.71 | 79.57 |
| Comparative Example 1 | 0.94 | 1.91 | 3.85 | 0.45 | 10.0 | 17.87 | 75.28 |
| Comparative Example 2 | 0.89 | 2.15 | 4.35 | 0.46 | 9.8 | 17.63 | 75.39 |
| Comparative Example 3 | 0.84 | 3.46 | 6.52 | 0.33 | 9.9 | 17.95 | 72.13 |
| Comparative Example 4 | 1.21 | 2.83 | 5.71 | 0.38 | 10.1 | 16.89 | 70.15 |
| Comparative Example 5 | 1.17 | 3.99 | 7.15 | 0.32 | 10.2 | — | — |

Hereinabove, although the present invention has been described by specific exemplary embodiments, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. A method of preparing silver particles having internal pores formed therein, comprising:

forming a silver complex by adding an alkaline solution or a complexing agent to an aqueous solution containing a silver (Ag) precursor and stirring the solution;

preparing silver slurry by adding a reducing agent, at 0.3 to 1.3 equivalents/sec relative to the silver, to the solution containing the silver complex, and heating and mixing the solution in a temperature range of 50 to 90° C. to precipitate silver particles; and obtaining the silver particles by filtering and drying the silver slurry, wherein the reducing agent is any one or more selected from the group consisting of formaldehyde, acetaldehyde, glyoxal, benzaldehyde and glucose, and in the preparing of the silver slurry, ultrasonic waves are not applied.

2. The method of claim 1, further comprising: pulverizing the obtained silver particles.

3. The method of claim 2, wherein the pulverizing includes mixing the silver particles with a lubricant.

* * * * *